United States Patent [19]

Sakuma

[11] Patent Number: 4,954,836

[45] Date of Patent: Sep. 4, 1990

[54] FOLLOW-UP SYSTEM FOR MOVING BODIES

[76] Inventor: Susumu Sakuma, 16-7, Uetomino 3-chome, Kokurakita-ku, Kitakyushu-shi, Fukuoka-ken, Japan

[21] Appl. No.: 121,430

[22] Filed: Nov. 17, 1987

[30] Foreign Application Priority Data

Sep. 8, 1987 [JP] Japan .................................. 62-224708
Oct. 27, 1987 [JP] Japan .................................. 62-270557

[51] Int. Cl.⁵ .............................................. G01S 3/02
[52] U.S. Cl. ..................................... 342/450; 342/457
[58] Field of Search ........ 342/450, 451, 457, 463–465, 342/386, 445, 423

[56] References Cited

U.S. PATENT DOCUMENTS 4,494,119 1/1985 Wimbush ........................... 342/457

FOREIGN PATENT DOCUMENTS 2221741 10/1974 France ................................ 342/450
2578059 8/1986 France ................................ 342/458

*Primary Examiner*—Thomas H. Tarcza
*Assistant Examiner*—Gregory C. Issing
*Attorney, Agent, or Firm*—Klein & Vibber

[57] ABSTRACT

A system follows up or traces a moving body accompanied by a radio signal transmitter which constantly generates a radio signal of a predetermined frequency or is adapted to generate such a radio signal when the user manually operates the transmitter should an emergency arise. The system includes two different antenna networks, one comprising a plurality of non-directional antennae disposed substantially evenly over a specific area, always ready to receive the radio signal which will or may be transmitted from anywhere in the area, and the other comprising directional antennas mounted at several points in the area. In response to the radio signal being monitored by one or more of non-directional antennae, at least two of directional antennae come into operation and two different directions in which the respective directional antennae show the maximum field strength are detected with field strength meters attached thereto, which makes it possible to determine an exact position of the signal source or the moving body according to triangular surveying. A computer may be of help to the operation of the system.

2 Claims, 3 Drawing Sheets

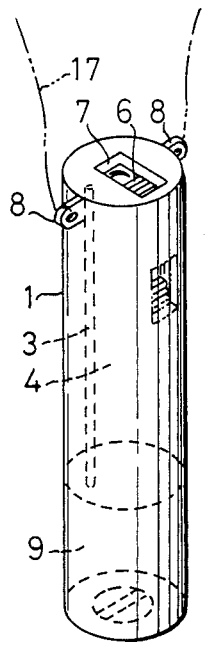
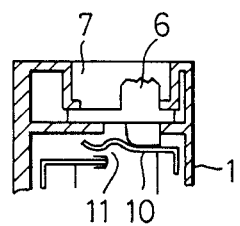
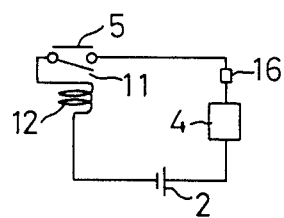

FOLLOW-UP SYSTEM FOR MOVING BODIES

BACKGROUND OF THE INVENTION

1. Field of the Invention

This invention relates in general to a follow-up system for moving bodies and more particularly to a novel system capable of taking defensive measures against emergencies by utilizing radio signal communication.

2. Prior Art

Among conventionally used instruments or devices to provide against emergencies or threats a device may include a portable alarm or a crime prevention buzzer which are carried at all times by a person to be protected and is adapted to sound a warning by a buzzer should an emergency arise. The warning buzzer sound would be audible by the neighborhood who will then immediately inform the police or other suitable authorities or companies for prompt investigation and rescue. However, no reaction could be expected in a thinly built-up area or at midnight. An assailant who hears the buzzer sound very closely might counterattack a victim in excitement.

Abduction or kidnaps are on the remarkable increase almost all over the world. In usual cases occurence of abduction is first known to the third party when a hostage's family, for example, receives a ransom call from the abductor. The hostage's family then informs the police or the investigating authorities to request a search. The police may trace a telephone call from the abductor to follow a lead on the case. The hostage's family, however, often tends to keep the case a secret to get the hostage back safe, in which case the police is kept out of the case and can not institute the search. No prompt investigation and rescue is established.

SUMMARY OF THE INVENTION

It is therefore an object of the invention to provide a novel system for preparing for the worst, making it possible to readily search a source of a radio signal transmitted by a person to be protected in an emergency for prompt investigation and rescue.

Another object of the invention is to apply the system in general to follow-up of moving bodies which can be utilized for labor control.

Still another object of the invention to provide a portable radio signal transmitter for transmitting a radio signal of a predetermined frequency, which should preferably be always carried by a person to be protected by the system.

According to one aspect of the invention there is provided a guard system for providing against emergency which comprises transmitters for generating radio signal of a predetermined frequency carried by persons to be protected by the system and operated when they are in an emergency; a plurality of non-directional antennas mounted dispersively within a protectable area, one or more of said non-directional antennas being sure to receive said radio signal transmitted from anywhere in said protectable area, thereby roughly determining locality of a source of said radio signal; a plurality of directional antennas mounted dispersively within said protectable area and provided with field strength meters, at least two of said directional antennas located near said non-directional antenna or antennas receiving said radio signal being operated in response to said non-directional antenna or antennas receiving said radio signal to rotate to detect two directions in which said directional antennas show the maximum field strength respectively; and a control center serving to specifically determine said radio signal source according to triangular surveying based on mounting position of said two directional antennas operated and said two directions in which said two directional antennas operated show the maximum field strength respectively.

According to another aspect of the invention there is provided a process for following up a moving body which comprises transmitting a radio signal of a predetermined frequency from a transmitter carried along with said moving body; receiving said radio signal by at least one of said non-directional antennas mounted dispersively within a specific coverable area; operating and rotating two or more directional antennas mounted dispersively within said specific coverable area in response to said at least one of said non-directional antennas receiving said radio signal, said directional antennas being provided with field strength meters respectively; detecting two directions in which said field strength meters of said directional antennas operate to show the maximum field strength; and specifically determining a source of said radio signal or an exact location of said moving body in accordance with triangular surveying based on mounting position of said two directional antennas operated and said two directions detected.

According to still another aspect of the invention there is provided a portable radio signal transmitter comprising a battery; an antenna; a radio signal generator adapted to generate a radio signal of a predetermined frequency; a switch adapted to be manually operated to close or open an oscillating circuit including said battery, said antenna and said radio signal generator, said switch being associated with a non-return contact adapted to maintain said oscillating circuit closed and thereby continuously generate said radio signal once said switch is operated to close said oscillating circuit; a housing made of a non-magnetic material protectively containing said battery, said antenna and said radio signal generator; and a switch operating member manually operatable by the user and provided within a recess formed on a surface of said housing, having no portion outside a level of an outer periphery of said housing.

BRIEF DESCRIPTION OF DRAWINGS

The other objects and advantages of the invention can be fully understood from the following description when read in conjunction with the accompanying drawings in which;

FIG. 2 is a perspective view showing a portable radio signal transmitter embodying one aspect of the invention and preferably used in the overall system of the invention;

FIG. 3 is a sectional view, on an enlarged scale, showing a top portion including a switch operating member of the transmitter shown in FIG. 2;

FIG. 4 shows a circuit coupled to the transmitter in FIG. 2; and

DETAILED DESCRIPTION OF THE INVENTION

Figure 1:
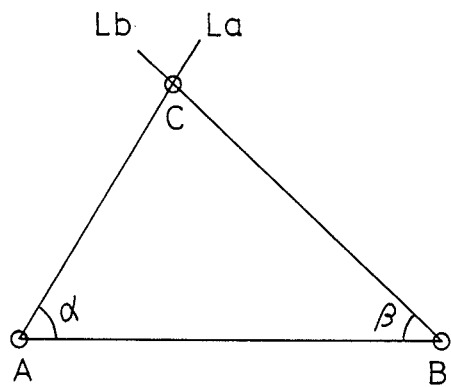
FIGS. 1, 1A, 1B and 1C are explanatory views of triangular surveying, a leading doctrine for specifically determining a radio signal source according to the invention.

Personal protection against emergencies according to one aspect of the present invention utilizes a transmitter adapted to generate a wireless signal. Each person to be protected by the present system must always carry the transmitter and manually switches the transmitter on should an emergency arise, thereby generating an emergency signal of a predetermined frequency. Before making the system operable, a frequency of the emergency signal should preferably be assigned and predetermined by the Radio Regulatory Comission or other authorities concerned to prevent jamming or interference. The emergency signal must have a strong enough output to be received by antennas described later.

This sytem further comprises, on the ground, a watching sub-system, a chasing sub-system and a computer sub-system.

The watching sub-system includes a plurality of non-directional antennas mounted substantially evenly over a protectable area which operates at all hours to watch out for emergency signals being transmitted. The emergency signal generated by the operator in an emergency will surely be detected by at least one of the non-directional antennas located relatively near a signal source. The detecting sub-system may preferably utilize a network of a security system already in operation.

The chasing sub-system includes several directional scanners or antennas mounted dispersively in the area which is being protected. This sub-system is operated in response to detection of the emergency signal by the antenna or antennas of the watching sub-system to rotate two or more of the directional antennas and to detect two directions in which field strength meters attached to the respective antennas show the maximum field strength values. With the data concerning the locations of the respective antennas and the two directions showing the maximum field strength, the signal source, indicating where the operator is located and held by the abductor, for example, will be determined by utilizing the doctrine of triangular surveying.

The computer sub-system functions to integrate informations of watching and chasing sub-systems and support operation thereof. Preferably, a display of the computer illustrates a map in the protectable area on a scale, which is magnified by degree as the chase progresses in the watching and chasing sub-systems. Detection of two directions showing the maximum field strength in the chasing sub-system may also be effected with a help of the computer.

The emergency signal transmitter may preferably be equipped with an additional function to generate at the same time a personal identification code by way of pulse code modulation, for example. This will make it possible to identify a person who encounters an emergency, as well as to determine the location where he or she is.

As aforementioned, according to the invention the doctrine of triangular surveying is utilized to determine the source of the emergency signal. This process will now be explained in more detail.

Referring to FIG. 1, two half lines La and Lb extending from fixed points A and B respectively cross each other at a point C, and angles between a segment of a line AB and the lines La and Lb are defined as $\alpha$ and $\beta$, respectively. In this case only one triangle ABC will be given, thus specifically determining the location of the intesecting point C. This summerizes the doctrine of triangular surveying.

Suppose scanners or antennas in the chasing sub-system are mounted at points A and B respectively, which show the maximum field strength in directions La and Lb respectively, a source of the emergency signal can readily be specified as being located at a point C.

Figure 1A:
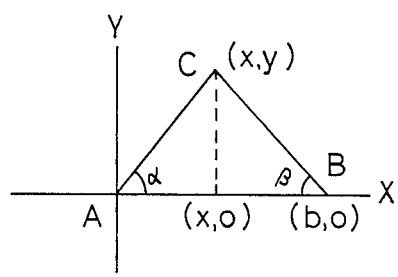
Figure 1B:
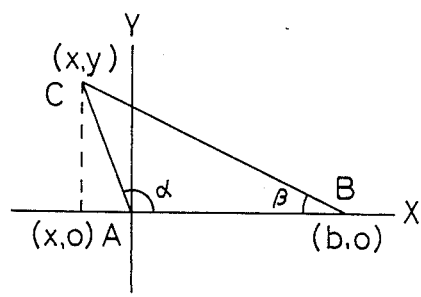
Figure 1C:
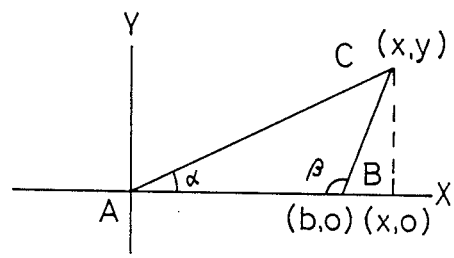

Referring now to FIGS. 1A, 1B and 1C, point A is an origin (0,0) and point B set on the X-axis has co-ordinates of (b,0). Provided that sides AB and AC cross each other at an angle $\alpha$ and sides BA and BC at an angle $\beta$, and that a point C is set on co-ordinates (x,y), the following two equations can be obtained:

$$y = x \tan \alpha \tag{1}$$

$$y = (b-x) \tan \beta \tag{2}$$

Equations (1) and (2) leads:

$$x \tan \alpha = (b - x) \tan \beta \tag{3}$$
$$\therefore x(\tan \alpha + \tan \beta) = b \tan \beta$$
$$\therefore x = \frac{b \tan \beta}{\tan \alpha + \tan \beta}$$

"x" in equation (1) is substituted by equation (3) to lead:

$$y = \frac{b \tan \alpha \cdot \tan \beta}{\tan \alpha + \tan \beta} \tag{4}$$

Thus, co-ordinates (x,y) of point C can be specified from equations (3) and (4).

In the above calculation point C is supposed to be located as shown in FIG. 1A where $0° < \alpha < 90°$ and $0° < \beta < 90°$, however, the same relations will apply to the cases of FIG. 1B where $90° < \alpha < 180°$ and $0° < \beta < 90°$ and FIG. 1C where $0° < \alpha < 90°$ and $90° < \beta < 180°$. The same will also apply to the case where point C is located below the X-axis.

In some special cases, co-ordinates of point C may be determined as follows:

Where $\alpha = 90°$ and $0° < \beta < 90°$, $x = 0$, $y = b \tan \beta$

Where $0° < \alpha° < 90°$ and $\beta = 90°$, $x = b$, $y = b \tan \alpha$

In some exceptional cases co-ordinates of point C can not be specifically determined but its location can be followed up on the following assumptions:

Where $\alpha = 0°$ and $\beta = 0°$,
C is located on the X-axis between A and B Where $\alpha = 0°$ and $\beta = 180°$,
C is located on the X-axis and on the right of B Where $\alpha = 180°$ and $\beta = 0°$,
C is located on the X-axis and on the left of B The portable transmitter used in the present system may be of any conventional type that generates a wireless signal of a predetermined frequency but erroneous operation should effectively be avoided. The signal should be transmitted only in an emergency but the conventional transmitter is not provided with means for preventing erroneous operation thereof resulting in the signal being unintentionally and unnecessarily generated and further in confusion of operation. According to the invention there is provided an emergency signal transmitter which is substantially free from malfunction and is operative only when transmission of the signal is really desired.

Referring to FIGS. 2 to 4, the emergency signal transmitter embodying the invention has a casing of non-magnetic material such as plastic. Casing 1 shown in FIG. 2 is shaped into a cylinder having a relatively small diameter of, for example, 1.5 to 2.0 cm and a length of about 5 to 10 cm. The casing may be differently shaped, one example of which is a small box of a size equivalent to a match box. The transmitter is handy for a pocket of the user and is sufficiently miniature to fit in a handbag. It can also be worn around the neck of the user by means of a chain or lace 17 passing through a pair of rings 8 flanged outwardly from a top edge of casing 1.

A battery 9 is contained in casing 1 at a bottom portion thereof. A rod antenna 3 extends upwardly from battery 9 and is exposed on the top surface of casing 1. The case may be that the antenna is constituted by a chain or lace 17 itself. A radio signal generator 4, coupled to battery 9 and antenna 3, is mounted in casing 1.

An overall oscillating circuit is represented in FIG. 4 which comprises a direct-current electric power supply 2 such as a battery 9 in this embodiment that can be wired to the opposite terminals of radio signal generator 4 by turning a switch 11 on. When the circuit is closed, a relay 12 become magnetized to close a non-return contact 5 which will keep the circuit closed irrespective of the position of switch 11. Thus, once the user operates switch 11 to close the circuit the generator 4 will continue to generate a radio signal of a predetermined frequency until the battery 9 runs out. The radio signal is transmitted via antenna 3 and received by one or more of the non-directional antennas of the detecting sub-system. Within the circuit there may optionally be connected in series a buzzer 16 to ring the alarm.

The top surface of casing 1 has a recess 7 into which a switch operating member 6 is slidably inserted. As particularly shown in FIG. 3, the switch operating member 6 is placed completely below the level of the top surface of housing 1. The switch operating member may alternatively be provided in a window on a side of housing 1 as shown by dashed lines in FIG. 2. Such construction will prevent malfunction of the switch while allowing it to be easily operated or slid by a finger tip of the user in case of emergency. The one-touch operation of the member 6 results in continuous transmission of the radio signal which is in turn an emergency signal.

In the foregoing descriptions the systems will come into practical use when a person carrying the radio signal transmitter such as shown in FIGS. 2 to 4 manually operates the transmitter to generate the emergency signal when he meets any emergency or contingency, particularly when he is abducted. The non-directional antennas of the watching sub-system will search for the emergency signal without a break and the directional antennas of the chasing sub-system will stand by so as to start its operation at any time responsive to detection of the emergency signal by one or more of the non-directional antennas.

This overall system is, however, applicable more widely to determination of the position of a moving body. For example, an insurance company employs a lot of salesmen dispersed over a specific area and spending almost their entire working hours outside the company. In view of labor control it is desirous to constantly watch where they are or how they move. This will be attainable by utilizing the network of the system according to the invention. Every salesman carries the portable radio signal transmitter about himself whose switch is fixed to be ON or which is equipped with no switch operating member to constantly generate the signal of a predetermined frequency, which is in turn caught by the non-directional antenna or antennas and by the directional antennas. Identification of each salesman can be made by frequency modulation.

TEST SAMPLE

Figure 5:
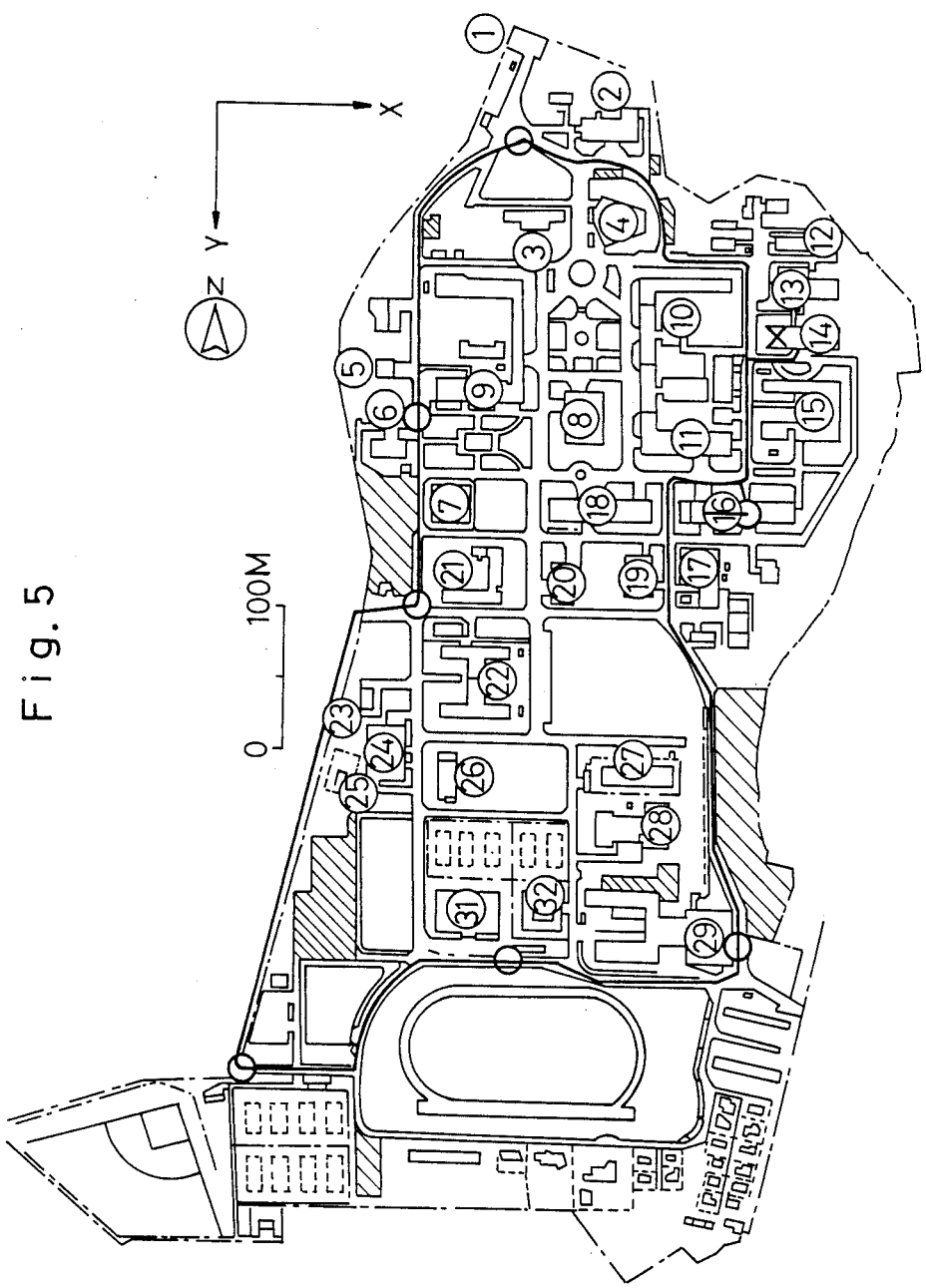
FIG. 5 is a map showing a trace of a signal source and a position of a directional antenna mounted, explaining the mode of test sample.

A radio control transmitter for radio-controlled model airplanes (Futaba Denshi Kogyo, FP-8AP, signal frequency of 40 MHz) was used as a portable radio signal transmitter. Referring to FIG. 5, a person carrying the transmitter with the switch kept turned on started walking from the roof of a 4-story building No. 14. He was slowly walking around the course shown by a successive bold line in the clockwise direction and returned again to the No. 14 building. On the way, he stopped at positions shown by a circle for 5 to 10 minutes.

A 4-element directional Yagi antenna (Maspro Denko, 50T4, for 52 MHz) was mounted on the roof of No. 14 building in a height of 4 m and rotated by a rotator (KENPRO, KR-5600A). A field strength meter (Leader Denshi, LFC-945) was coupled to the antenna via coaxial cable (75Ω) to measure with the eye a direction in which the meter showed a maximum field strength value.

The purpose of this test was to compare with each other a position of the transmitter and a direction showing the maximum field strength, both varying with the time. As a result it was confirmed that the transmitter was positioned substantially in the direction of the antenna showing the maximum field strength. This means that a radio signal source can be traced in accordance with triangular surveying.

It should be noted that instruments including transmitter and antenna used in this test are not high-fidelity one. The eye-measurement of the directions showing hte maximum field strength would produce errors to some degree. Nevertheless, substantially satisfactory results were obtained in this test. If high-fidelity transmitters and receivers be used and the maximum field strength be automatically detected with the help of a computer, more reliable results will be obtained, leading to more acurate and definite determination of the radio signal source. Thus, prompt rescue or search may be arranged.

Although the present invention has been described in conjunction with specific embodiments and a test sample, it is to be noted that the invention is not limited thereto and many modifications and variations may be made without departing from the spirits and scopes of the invention as defined in the appended claims.

What we claim is:

1. A system for locating a moving body within a predetermined area, said moving body being accompanied by a radio signal transmitter, said transmitter having a predetermined range of transmission and transmitting a signal of predetermined frequency, said system comprising a first antenna network and a second antenna network, said first antenna network comprising a plurality of non-directional antennae located at points disposed substantially evenly over said predetermined area, said second antennae network comprising a plurality of directional antennae located at predetermined points disposed within said predetermined area;

said non-directional antennae being located such that one or more of said non-directional antennae is always within the range of transmission of said transmitter;

each of said directional antennae being provided with means for rotation and means for measuring the strength of signals received by said directional antennae;

controlling means activated by said signal of predetermined frequency received by one or more of said non-directional antennae;

said controlling means, when activated, directing rotation of said rotation means of two of said directional antennae until the strength of signals received by said directional antennae is maximized;

said controlling means indicating the relative rotation of directional antennae rotation;

said moving body being locatable by triangulation of the relative rotation of said directional antennae;

said controlling means comprising associating pairs of directional antennae with individual non-directional antennae and said controlling means associating location points with said antennae; whereby when said controlling means is activated, said controlling means can automatically locate the moving body relative to the antennae networks and relative to points of location of said antennae in said predetermined area; and map information means, said controlling means associating said antennae locations with map information from said map information means regarding said predetermined area, whereby, when said controlling means associates locations of said antennae and relative rotation of said directional antennae is associated with the map information, said moving body is located.

2. The system as claimed in claim 1, wherein said transmitter transmits identification information such that said controlling means may determine identity as well as location of the moving body.

* * * * *